United States Patent
Zhao et al.

(10) Patent No.: US 9,866,111 B1
(45) Date of Patent: Jan. 9, 2018

(54) REGULATED CHARGE PUMP CIRCUIT

(71) Applicant: Marvell International Ltd., Hamilton (BM)

(72) Inventors: Xiaoxiao Zhao, Shanghai (CN); Wenrong Qian, Shanghai (CN); Yifeng Huang, San Jose, CA (US); Yongxu Wang, Shanghai (CN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/198,802

(22) Filed: Jun. 30, 2016

Related U.S. Application Data

(60) Provisional application No. 62/189,862, filed on Jul. 8, 2015.

(51) Int. Cl.
*G05F 3/02* (2006.01)
*H02M 3/07* (2006.01)

(52) U.S. Cl.
CPC .................. *H02M 3/07* (2013.01)

(58) Field of Classification Search
CPC ............ G05F 3/02; G09G 2330/021; G09G 2330/022; G09G 2330/023; G09G 2330/024; G09G 3/3696; G09G 3/3688; G09G 3/33685; H02M 3/07; H02M 1/36

USPC ......................................... 327/536
See application file for complete search history.

(56) References Cited

U.S. PATENT DOCUMENTS

| | | | | |
|---|---|---|---|---|
| 2007/0285154 A1* | 12/2007 | Darabi | ................ | H03B 21/01 327/551 |
| 2009/0121781 A1* | 5/2009 | Oyama | ................ | H02M 3/07 327/536 |
| 2015/0207404 A1* | 7/2015 | Philip | ................ | H02M 3/158 455/73 |

\* cited by examiner

*Primary Examiner* — Lincoln Donovan
*Assistant Examiner* — Patrick Chen

(57) ABSTRACT

Aspects of the disclosure provide a circuit for providing a power supply. The circuit includes a control signal generator circuit and a switch network circuit. The control signal generator circuit is configured to generate a control signal with a voltage level that is a function of an output voltage on a load capacitor. The switch network circuit is coupled with the load capacitor and a flying capacitor to form a charge pump circuit. The switch network circuit is configured to charge the flying capacitor in a charge stage and pump the flying capacitor in a pump stage to generate the output voltage on the load capacitor. The switch network circuit is configured to provide a pump control voltage to the flying capacitor during the pump stage. The pump control voltage has a voltage level that is adjusted based on the control signal to maintain the output voltage to be stable.

14 Claims, 3 Drawing Sheets

REGULATED CHARGE PUMP CIRCUIT

INCORPORATION BY REFERENCE

This present disclosure claims the benefit of U.S. Provisional Application No. 62/189,862, "Regulating charge pump with small output ripples" filed on Jul. 8, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A charge pump circuit provides a power supply that is used by other circuits on an integrated circuit (IC) chip. In an example, an IC chip uses a charge pump circuit to receive an external supply voltage and to generate an internal supply voltage. The internal supply voltage is provided to, for example, digital circuits on the IC chip to provide power to the digital circuits.

SUMMARY

Aspects of the disclosure provide a circuit for providing a power supply. The circuit includes a control signal generator circuit and a switch network circuit. The control signal generator circuit is configured to generate a control signal with a voltage level that is a function of an output voltage on a load capacitor. The switch network circuit is coupled with the load capacitor and a flying capacitor to form a charge pump circuit. The switch network circuit is configured to charge the flying capacitor in a charge stage and pump the flying capacitor in a pump stage to generate the output voltage on the load capacitor. The switch network circuit is configured to provide a pump control voltage to the flying capacitor during the pump stage. The pump control voltage has a voltage level that is adjusted based on the control signal to maintain the output voltage to be stable.

In an embodiment, the switch network circuit is configured to adjust a conductivity of a switch coupled to the flying capacitor based on the control signal during the pump stage of a charging cycle in order to adjust the pump control voltage. In an example, the switch includes a transistor configured to receive the control signal at a gate terminal, and a drain terminal of the transistor is coupled to the flying capacitor. Thus a voltage drop on the transistor is a function of the control signal.

According to an aspect of the disclosure, the circuit includes a clock generator circuit configured to generate multi-phase clock signals to control the switch network circuit to enter the charge stage and to enter the pump stage. In an embodiment, the control signal generator circuit includes an amplifier configured to generate a voltage based on the output voltage, a voltage buffer configured to buffer the voltage and output a buffered voltage, and a logic circuit to combine the buffered voltage with the multi-phase clock signals to generate the control signal. In an embodiment, the amplifier includes an operational transconductance amplifier (OTA) coupled with a capacitor. The operational transconductance amplifier is configured to output a current based on a difference between the output voltage and a reference voltage, and to charge the capacitor by the current to generate the voltage on the capacitor.

In an example, the logic circuit includes a transmission gate that is controlled by the multi-phase clocks signals to relay the buffered voltage to generate the control signal.

Aspects of the disclosure provide a method for regulating voltage. The method includes generating a control signal with a voltage level that is a function of an output voltage on a load capacitor, providing the control signal to a switch network circuit that is coupled with the load capacitor and a flying capacitor to foul' a charge pump circuit, charging the flying capacitor in a charge stage, and providing a pump control voltage to the flying capacitor in a pump stage. The pump control voltage has a voltage level that is adjusted based on the control signal to maintain the output voltage to be stable.

Aspects of the disclosure provide an integrated circuit (IC) chip that includes a voltage regulator and one or more functional circuits. The voltage regulator includes a control signal generator circuit configured to generate a control signal with a voltage level that is a function of an output voltage on a load capacitor and a switch network circuit coupled with the load capacitor and a flying capacitor to form a charge pump circuit. The switch network circuit is configured to charge the flying capacitor in a charge stage and to pump the flying capacitor in a pump stage to generate the output voltage on the load capacitor. The switch network circuit is configured to provide a pump control voltage to the flying capacitor during the pump stage. The pump control voltage has a voltage level that is adjusted based on the control signal to maintain the output voltage to be stable. The functional circuits are powered up by the output voltage on the load capacitor.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
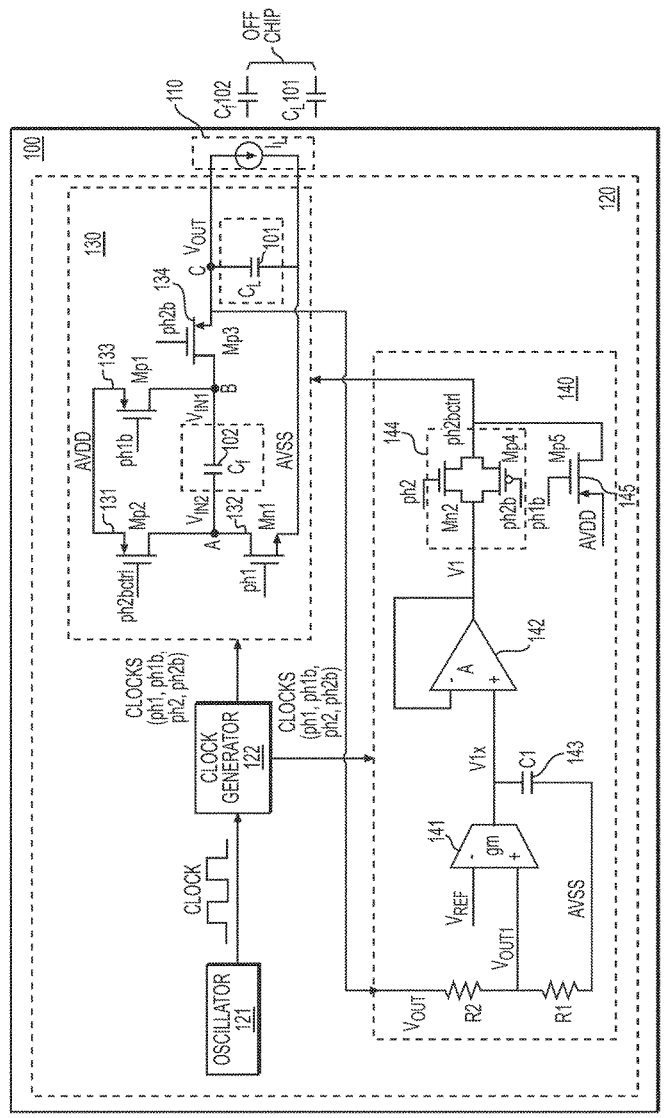
FIG. 1 shows a diagram of a circuit according to an embodiment of the disclosure.

FIG. 1 shows a diagram of a circuit 100 according to an embodiment of the disclosure. The circuit 100 includes a voltage regulator 120 configured to receive a supply voltage AVDD (also referred to as a first supply voltage), generate and provide an output voltage Vout (also referred to as a second supply voltage) to load circuits 110. In an embodiment, the output voltage Vout has a voltage level that is relatively stable in response to various variations, such as load current demand in the load circuits 110, and the like. According to an aspect of the disclosure, the voltage regulator 120 is a charge pump based voltage regulator. The voltage regulator 120 is configured to adjust a pump control voltage to a flying capacitor to maintain a stable voltage on a load capacitor.

It is noted that the circuit 100 can be any suitable circuit that uses a charge pump based power supply circuit to generate a stable voltage to drive load circuits 110. In an example, the circuit 100 is an integrated circuit (IC) chip, such as a system-on-chip (SOC) that integrates various components, such as analog circuits, digital circuits, mixed-signal circuits, and the like on a chip. In an embodiment, the circuit 100 is configured to provide different supply voltages to the different circuits to achieve various advantages. For example, the circuit 100 provides the supply voltage AVDD, such as about 1.4 V, to analog circuits (not shown) to satisfy operation requirement of the analog circuits. Further, in an example, the load circuits 110 include digital functional circuits that can be driven by a relatively small voltage, such as about 1V, in order to save power. In the example, the voltage regulator 120 is configured to generate the output voltage Vout of 1V, and provide the output voltage Vout to the load circuits 110 to drive the digital functional circuits.

In another example, the load circuits 110 includes, for example, flash memory circuits that require a relatively high voltage, such as 1.8V, to operate properly. In the example, the voltage regulator 120 is configured to generate the output voltage Vout of 1.8V, and provide the output voltage Vout to the load circuits 110 to drive the flash memory circuits.

It is noted that, in the FIG. 1 example, the supply voltage AVDD is a positive power supply, and the circuit 100 also receives a negative power supply AVSS. In an example, the negative power supply AVSS is ground. In the FIG. 1 example, the circuits in the load circuits 110 are lumped and represented using a current source/sink with a load current $I_L$.

The voltage regulator 120 is a charge pump based voltage regulator that includes at least one flying capacitor as an energy transfer element, and a load capacitor to store charges and provide an output voltage. The voltage regulator 120 is configured to repetitively charge and pump the flying capacitor to maintain the output voltage. In an example, the voltage regulator 120 cyclically charges and pumps the flying capacitor. Each cycle includes a charge stage and a pump stage. In the charge stage, the flying capacitor is charged to store charges; and in the pump stage, the flying capacitor transfers the stored charges to the load capacitor. According to an aspect of the disclosure, the voltage regulator 120 is configured to adjust a pump control voltage provided to the flying capacitor based on the output voltage Vout during the pump stage in order to maintain a relatively stable output voltage. The adjustment of the pump control voltage in a pump stage of a cycle adjusts the amount of charges that is pumped to the load capacitor in the cycle to compensate the energy provided to the load circuit in the cycle, and thus maintains a relatively stable output voltage. In an example, because of the pump control voltage adjustments, the output voltage has relatively small ripples that are negligible. In addition, the output voltage does not include certain frequency components that depend on the load current $I_L$.

Specifically, in the FIG. 1 example, the voltage regulator 120 includes an oscillator 121, a clock generator 122, a charge pump circuit 130 and a control signal generator circuit 140 coupled together as shown in FIG. 1.

In an embodiment, the oscillator circuit 121 is configured to generate a clock signal CLOCK. In an example, the clock signal CLOCK is in the form of a square wave with 50% duty cycle. It is noted that the clock signal CLOCK can have other suitable form, and the oscillator circuit 121 can use any clock generation technology to generate the clock signal CLOCK. In an example, the oscillator circuit 121 receives an oscillation signal output from an off-chip crystal oscillator (not shown), and generates the clock signal CLOCK based on the oscillation signal. In another example, the circuit 100 includes an on-chip ring oscillator (not shown), and the oscillator circuit 121 generates the clock signal CLOCK based on an output from the on-chip ring oscillator.

The clock generator 122 is configured to generate multi-phase clock signals, and provide the multi-phase clock signals to other circuits, such as the charge pump circuit 130, the control signal generator circuit 140, and the like to control the timings of operations by the other circuits. In an example, the clock generator 122 generates two-phase clock signals ph1 and ph2. The two-phase clock signals ph1 and ph2 have non-overlapping pulses. The clock generator 122 also generates complement clock signals ph1b and ph2b for the two-phase clock signals ph1 and ph2. The clock signal ph1 and the clock signal ph1b are complement clocks (inversion of each other), and the clock signal ph2 and the clock signal ph2b are complement clocks (inversion of each other). In an example, the two phase clock signals ph1 and ph2 are used to control the charge pump circuit 130 to enter different stages of operations. For example, when the clock signal ph1 is of the high voltage level, the charge pump circuit 130 is in the charge stage; and when the clock signal ph2 is of the high voltage level, the charge pump circuit 130 is in the pump stage.

The charge pump circuit 130 includes a load capacitor, one or more flying capacitors and a switch network circuit configured to repetitively charge and pump the flying capacitors to provide charges to the load capacitor. Specifically, in the FIG. 1 example, the charge pump circuit 130 includes a load capacitor (first capacitor) 101 with a capacitance $C_L$, a flying capacitor (second capacitor) 102 with a capacitance $C_f$, and a plurality of switches 131-134 coupled with the load capacitor 101 and the flying capacitor 102 as shown in FIG. 1. The plurality of switches 131-134 form the switch network circuit.

In the FIG. 1 example, the load capacitor 101 is coupled between node C and the power supply AVSS to provide an output voltage Vout (second power supply) at node C; the flying capacitor 102 is coupled between node A and node B; the switch 131 is coupled between the power supply AVDD and node A; the switch 132 is coupled between node A and the power supply AVSS; the switch 133 is coupled between the power supply AVDD and the node B; and the switch 134 is coupled between node B and node C.

In an embodiment, the load capacitor 101 and the flying capacitor 102 are implemented as off chip components. In another embodiment, the load capacitor 101 and flying capacitor 102 are implemented as on chip components.

The switches 131-134 are suitably implemented using any suitable technology. In the FIG. 1 example, the switches 131-134 are implemented using metal-oxide-semiconductor field-effect transistors (MOSFETs). For example, the switch 131 is implemented using a P-type MOSFET transistor Mp2, the switch 132 is implemented using an N-type MOSFET transistor Mn1, the switch 133 is implemented using a P-type MOSFET transistor Mp1, and the switch 134 is implemented using a P-type MOSFET transistor Mp3.

Further, in the FIG. 1 example, the switches 132-134 are controlled by the two-phase clock signals (e.g., ph1 and ph2) and their complement clock signals (e.g., ph1b and ph2b), and the switch 131 is gate-controlled by a control signal ph2bctrl with a voltage level adjusted based on the output voltage Vout.

In the FIG. 1 example, the two-phase clock signals and their complement clock signals have two stable voltage levels (e.g., about AVDD level, and about AVSS level), and toggle between the two stable voltage levels to switch on the MOSFETs or switch off the MOSFETs. For example, when the clock signal ph1 has a relatively high stable voltage level (e.g., about AVDD level), the transistor Mn1 is fully switched on and has a relatively high conductivity, the drain voltage of the transistor Mn1 is about the same as the source voltage of the transistor Mn1, a voltage drop on the transistor Mn1 is very small and can be neglected; and when the clock signal ph1 has a relatively low stable voltage level (e.g., about AVSS level), the transistor Mn1 is fully switched off to disconnect the node A from the power supply AVSS.

Similarly, in an example, when the clock signal ph1b has a relatively low stable voltage level (e.g., about AVSS level), the transistor Mp1 is fully switched on and has a relatively high conductivity, the drain voltage of the transistor Mp1 is about the same as the source voltage of the transistor Mp1, a voltage drop on the transistor Mp1 is very small and can be neglected; and when the clock signal ph1b has a relatively high stable voltage level (e.g., about AVDD level), the transistor Mp1 is fully switched off to disconnect the node B from the power supply AVDD.

According to an aspect of the disclosure, the control signal ph2bctrl has a voltage level that is adjusted based on the output voltage Vout. For example, the control signal ph2bctrl has two stable voltage levels, such as a first stable voltage level (higher one) and a second stable voltage level (lower one). In an example, the first stable voltage level is about AVDD level, and the second stable voltage level is adjusted based on the output voltage Vout and is between AVSS and AVDD in an example. For example, when the output voltage Vout increases, the second stable voltage level is adjusted to be higher in the direction to lower the output voltage Vout; and when the output voltage Vout decreases, the second stable voltage level is adjusted to be lower in the direction to increase the output voltage Vout.

In an example, the control signal ph2bctrl is provided to the gate terminal of the transistor Mp2 to control the conductivity of the transistor Mp2. For example, when the control signal ph2bctrl has the first stable voltage level (e.g., about AVDD level), the transistor Mp2 is switched off to disconnect node A from the power supply AVDD; and when the control signal ph2bctrl has the second stable voltage level that is adjusted based on the output voltage Vout, the conductivity of the transistor Mp2 depends on the second stable voltage level. Further, the voltage drop on the transistor Mp2 depends on the conductivity of the transistor Mp2.

The control signal generator circuit 140 is configured to generate the control signal ph2bctrl to control the charge pump circuit 130 based on the output voltage Vout, in an embodiment. In the FIG. 1 example, the control signal generator circuit 140 includes two resistors R1 and R2, an operational transconductance amplifier (OTA) 141, a capacitor 143, a voltage buffer 142, a transmission gate 144, and a switch 145 coupled together as shown in FIG. 1.

The two resistors R1 and R2 form a voltage divider. The resistors R1 and R2 are suitably designed to have a suitable ratio for voltage scaling. The voltage divider receives the output voltage and generates a scaled output voltage Vout1 according to the ratio for voltage scaling.

The OTA 141 is configured to compare the scaled output voltage Vout1 with a reference voltage $V_{REF}$, and generate a current proportional to a difference between the scaled output voltage Vout1 and the reference voltage $V_{REF}$. The current charges the capacitor 143 to generate a control voltage V1x. In an example, the capacitor 143 is designed with a relatively small capacitance C1, and then is implemented on chip.

The voltage buffer 142 then buffers the control voltage V1x, and outputs a buffered control voltage V1. In an example, the buffered control voltage V1 is of the same level as the control voltage V1x. In the FIG. 1 example, the voltage buffer 142 is implemented using an operational amplifier. The voltage buffer 142 insulates the control voltage V1x from disturbances, such as charge sharing effects from the load of the voltage buffer 142. The voltage buffer 142 is configured to drive the buffered control voltage V1 without disturbance to the control voltage V1x.

The voltage buffer 142 drives the buffered control voltage V1 through the transmission gate 144 that is controlled by the clock signal ph2 and the clock signal ph2b. In the FIG. 1 example, the transmission gate 144 includes an N-type MOSFET transistor Mn2, and a P-type MOSFET transistor Mp4 coupled together as shown in FIG. 1. The transistor Mn2 is controlled by the clock signal ph2 and the transistor Mp4 is controlled by the clock signal ph2b which is the complement clock signal of the clock signal ph2. For example, when the clock signal ph2 is of the high stable voltage level (e.g., about AVDD), the clock signal ph2b is of the low stable voltage level (e.g., about AVSS), the transmission gate 144 is turned on, and the voltage buffer 142 drives the control signal ph2bctrl to be about the same voltage level as the buffered control voltage V1, and thus about the same voltage level as the control voltage V1x. When the clock signal ph2 is of the low stable voltage (e.g., about AVSS), the transmission gate 144 is turned off.

The switch 145 is implemented using a P-type MOSFET transistor Mp5, and is gate controlled by the clock signal ph1b.

In the FIG. 1 example, when the clock signal ph2 is of the low stable voltage level, the clock signal ph2b is of the high stable voltage level, and the transmission gate 144 is turned off. Further, when the clock signal ph1 transits from the low stable voltage level to the high stable voltage level, the clock signal ph1b transits from the high voltage level to the low stable voltage level, thus the transistor Mp5 is turned on, and the control voltage ph2bctrl transits to about the same voltage level as the supply voltage AVDD.

In an example, when the clock signal ph1 is about AVDD voltage level, the clock signal ph1b is about AVSS voltage level, the clock signal ph2 is about AVSS voltage level, the clock signal ph2b is about AVDD voltage level, the control signal ph2bctrl is about AVDD voltage level, and the charge pump circuit 130 is in the charge stage. In the charge stage, the transistor Mn1 is fully turned on, the transistor Mp1 is fully turned on, the transistor Mp2 is turned off, and the transistor Mp3 is turned off, thus the voltage at node B is charged to about AVDD voltage level, the voltage at node A is about AVSS voltage level.

Further, when the clock signal ph2 is about AVDD voltage level, the clock signal ph2b is about AVSS voltage level, the clock signal ph1 is about AVSS voltage level, the clock signal ph1b is about AVDD voltage level, the control signal ph2bctrl is about V1x voltage level, and the charge pump circuit 130 is in the pump stage. In the pump stage, the transistor Mn1 is turned off, the transistor Mp1 is turned off, the transistor Mp3 is fully turned on. The transistor Mp2 is turned on with a conductivity based on the voltage level of V1x, and node A is charged to a pump control voltage VX based on the voltage level of V1x.

In an example, the voltage level of V1x in a first situation is lower than the voltage level of V1x in a second situation, then the transistor Mp2 has a higher conductivity (e.g., a deeper channel) in the first situation than the second situation, and the pump control voltage VX at node A in the first situation is higher than the pump control voltage VX at node A in the second situation.

In an example, an average of the output voltage Vout is expressed using Eq. 1.

$$V_{OUT} = AVDD + VX - \frac{I_L}{2C_f f_{clk}} \qquad \text{Eq. 1}$$

where $I_L$ denotes the load current of load circuits 110, and $f_{clk}$ denotes the clock frequency of the clock signals, such as the clock signal CLOCK, the clock signal ph1, the clock signal ph2, and the like.

In an example, according to EQ. 1, the output voltage Vout has a maximum value when the pump control voltage VX is about AVDD voltage level. The maximum value is expressed using Eq. 2:

$$V_{OUT} = 2AVDD - \frac{I_L}{2C_f f_{clk}} \qquad \text{Eq. 2}$$

According to an aspect of the disclosure, the voltage regulator 120 is configured to operate in response to load current demand of the load circuits 110 and maintain a relatively stable output voltage with relatively small ripples and without tones (certain frequency components in frequency domain).

During operation, in an example, when the load current demand (e.g., $I_L$) of the load circuits 110 increases, the increase of the load current causes the output voltage Vout to drop. Due to the output voltage drop, the scaled voltage Vout1 is lower than the reference voltage $V_{REF}$, the OTA 141 outputs a negative current, thus the voltage V1x on the capacitor C1 is reduced, and the buffered voltage V1 is also reduced. In the pump stage, the buffered voltage V1 is provided to the gate terminal of the transistor Mp2. Due to the reduced buffered voltage V1, the transistor Mp2 has a deeper channel, and has increased conductivity, thus the pump control voltage VX at node A during the pump stage increases, and thus more charges are pumped to the load capacitor $C_L$ to satisfy the increase of the load current demand.

On the other hand, in the example, when the load current demand (e.g., $I_L$) of the load circuits 110 decreases, the decrease of the load current causes the output voltage Vout to rise. Due to the output voltage rise, the scaled voltage Vout1 is higher than the reference voltage $V_{REF}$, the OTA 141 outputs a positive current, thus the voltage V1x on the capacitor C1 increases, and the buffered voltage V1 increases. In the pump stage, the buffered voltage V1 is provided to the gate terminal of the transistor Mp2. Due to the increase of the buffered voltage V1, the transistor Mp2 has a shallow channel, and has a reduced conductivity, thus the pump control voltage VX at node A during the pump stage decreases, and thus fewer charges are pumped to the load capacitor $C_L$ to suit the decrease of the load current demand.

In an example, when the load current demand is stable, the variation of the output voltage Vout in a clock cycle is expressed using Eq. 3:

$$\text{Variation} = \frac{I_L}{C_f f_{clk}} \qquad \text{Eq. 3}$$

In the example, when the clock frequency $f_{clk}$ is relatively large, such as in a range from 1 MHz to 10 MHz, and the capacitance $C_f$ of the flying capacitor 102 is large, the variation of the output voltage Vout in each clock cycle is small, such as smaller than 10 mV, and negligible. Thus, the output voltage Vout is stable with negligible ripples. Further, the variation has about same frequency as the clock signal, and does not introduce other frequency components.

In a related charge pump example that uses a hysteresis comparator, in order to avoid frequent power on/off of a clock generator, a window of the hysteresis comparator is selected to be relatively large. The size of the ripples is determined by the window of the hysteresis comparator, and is not negligible. In an example, an output voltage Vout waves between a high voltage value, such as 1.05V for 1V normal output voltage, and a low voltage value, such as 0.95V for 1V normal output voltage. Further, a frequency of the waves (ripples) of the output voltage Vout depends on the load current demand, and thus the waves of the output voltage Vout introduce frequency components other than the clock frequency. When the load current demand is high, the output voltage Vout waves between the high voltage value and the low voltage value more frequently, when the load current demand is low, the output voltage Vout waves between the high voltage value and the low voltage value less frequently.

Figure 2:
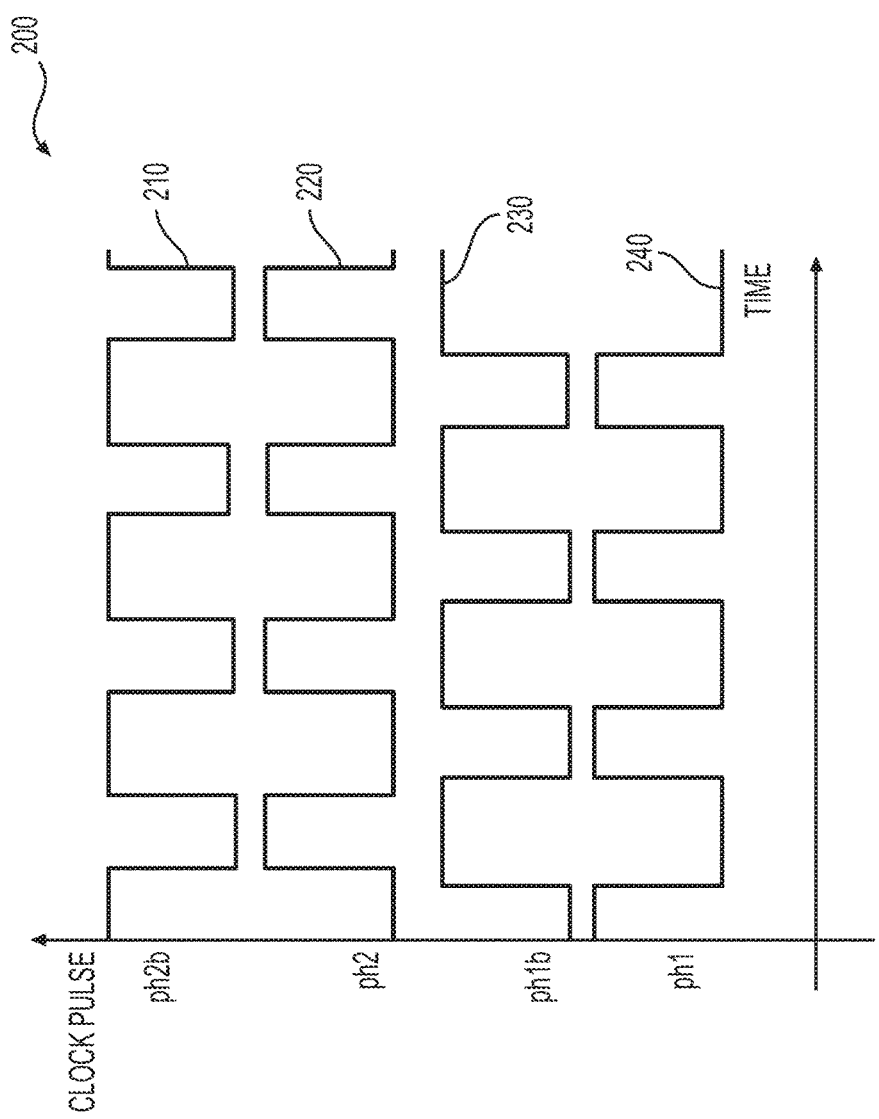
FIG. 2 shows a plot of waveforms according to an embodiment of the disclosure.

FIG. 2 shows a plot 200 of waveforms of two-phase clock signals according to an embodiment of the disclosure. In an example, the two-phase clock signals are generated by the clock generator 122 in FIG. 1.

The plot 200 includes a first waveform 210 for the clock signal ph2b, a second waveform 220 for the clock signal ph2, a third waveform 230 for the clock signal ph1b, and a fourth waveform 240 for the clock signal ph1. As seen in FIG. 2, the two-phase clock signals ph1 and ph2 have non-overlapping pulses. The clock signal ph1 and the clock signal ph1b are complement clocks (inversion of each other), and the clock signal ph2 and the clock signal ph2b are complement clocks (inversion of each other). In an example, the two phase clock signals ph1 and ph2 are used to control the charge pump circuit 130 to enter different stages of operations. For example, when the clock signal ph1 is of the high voltage level, the charge pump circuit 130 is in the charge stage; and when the clock signal ph2 is of the high voltage level, the charge pump circuit 130 is in the pump stage. In an example, the clock signals ph1, ph1b, ph2 and ph2b are generated based on a clock signal of 50% duty cycle.

Figure 3:
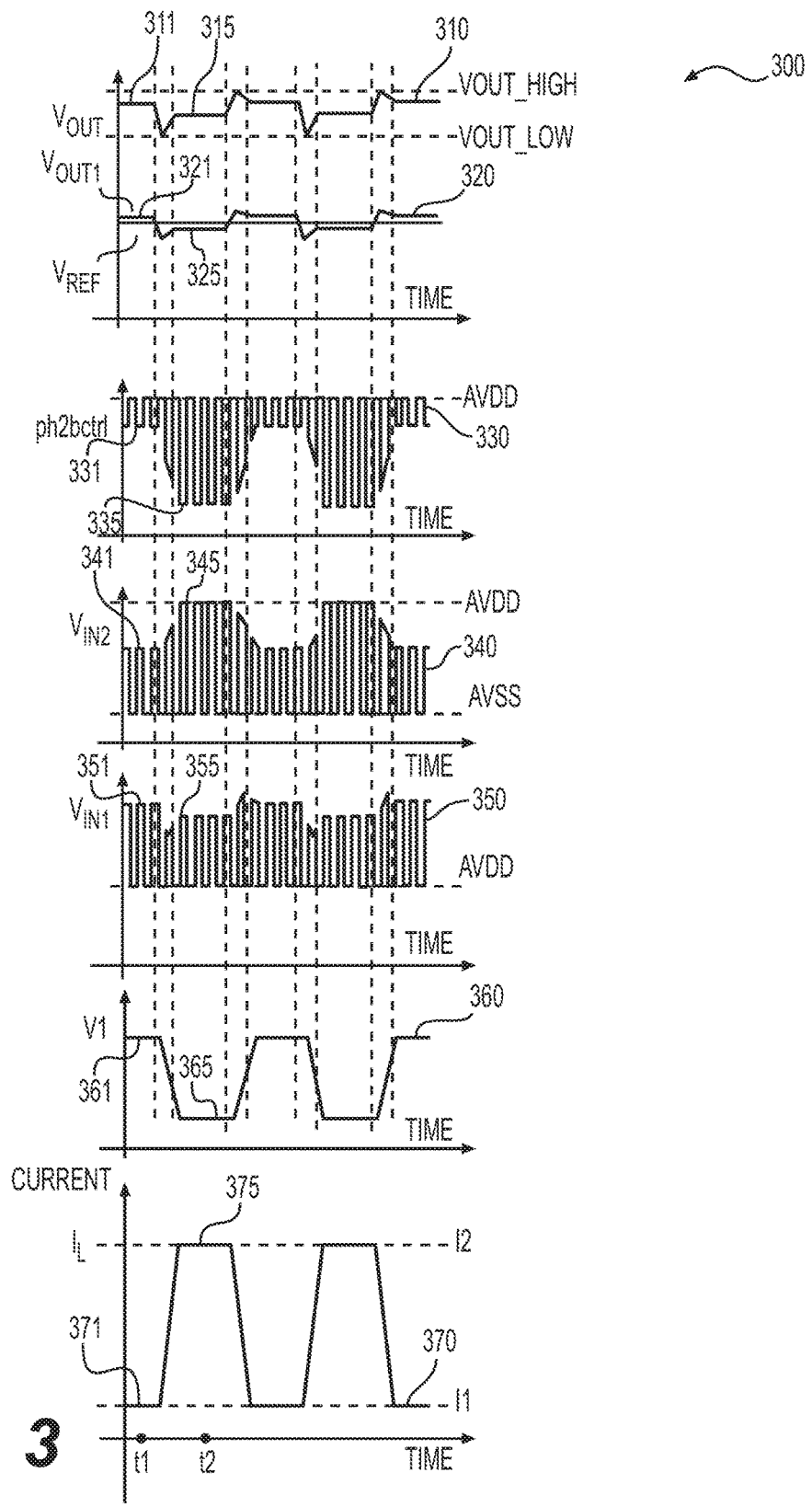
FIG. 3 shows a plot of waveforms according to an embodiment of the disclosure.

FIG. 3 shows a plot 300 of simulation waveforms for the signals in the FIG. 1 example according to an embodiment of the disclosure. The plot 300 includes a first waveform 310 for the output voltage Vout, a second waveform 320 for the scaled output voltage Vout1, a third waveform 330 for the control signal ph2bctrl, a fourth waveform 340 for the voltage Vin2 at node A, a fifth waveform 350 for the voltage Vin1 at node B, a sixth waveform 360 for the buffered voltage V1, and a seventh waveform 370 for the load current $I_L$.

In the example, the load current demand varies. For example, at a time t1, the load current $I_L$ is relatively low (I1) as shown by 371, and at a time t2, the load current $I_L$ is relatively high (I2) as shown by 375.

At the time t1 when the load current $I_L$ is low, the output voltage Vout is relatively high as shown by 311. The scaled output voltage Vout1 is higher than the reference voltage $V_{REF}$ as shown by 321. The OTA 141 outputs positive current to charge up the capacitor 143, thus the voltage V1*x* is relatively high and the buffered voltage V1 is relatively high as shown by 361.

When the clock signal ph2 is of the AVDD voltage level (in the pump stage) and the clock signal ph2*b* is of the AVSS voltage level, the buffered voltage V1 is provided as the control signal ph2*bctrl* to the gate terminal of the transistor Mp2, as shown by 331. Due to the relatively high voltage of the control signal ph2*bctrl*, the transistor Mp2 has relatively shallow channel, and relatively low conductivity, thus the voltage Vin2 (the pump control voltage) at node A is relatively small, as shown by 341. The transistor Mp3 is fully turned on in the pump stage, the voltage Vin1 at node B is about the same level as the output voltage Vout as shown by 351.

At the time t2 when the load current $I_L$ is relatively high, the output voltage Vout is relatively low as shown by 315. The scaled output voltage Vout1 is lower than the reference voltage $V_{REF}$ as shown by 325. The OTA 141 outputs negative current to discharge the capacitor 143, thus the voltage V1*x* is relatively low and the buffered voltage V1 is relatively low as shown by 365.

When the clock signal ph2 is the AVDD voltage level (in the pump stage) and the clock signal ph2*b* is of the AVSS voltage level, the buffered voltage V1 is provided as the control signal ph2*bctrl* to the gate terminal of the transistor Mp2, as shown by 335. Due to the relatively low voltage of the control signal ph2*bctrl*, the transistor Mp2 has relatively deep channel, and relatively high conductivity, thus the voltage Vin2 (pump control voltage) at node A is relatively high, as shown by 345. Because the transistor MP3 is fully turned on, the voltage Vin1 at node B is about the same level as the output voltage Vout as shown by 355.

In the example, due to the change of load current demand, the output voltage Vout varies between a high value VOUT_HIGH, and a low value VOUT_LOW. In the example, the difference between the high value VOUT_HIGH and the low value VOUT_LOW is in the range of 50 mV to 100 mV.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit for providing a power supply, comprising:
   a control signal generator circuit configured to generate a control signal with a voltage level that is a function of an output voltage on a load capacitor, the control signal generator circuit including (i) an amplifier configured to generate a voltage based on the output voltage, (ii) a voltage buffer configured to buffer the voltage, and output a buffered voltage, and (iii) a logic circuit configured to combine the buffered voltage with multi-phase clock signals to generate the control signal;
   a switch network circuit coupled with the load capacitor and a flying capacitor to form a charge pump circuit, the switch network circuit being configured to charge the flying capacitor in a charge stage and to pump the flying capacitor in a pump stage to generate the output voltage on the load capacitor, the switch network circuit configured to provide a pump control voltage to the flying capacitor during the pump stage, the pump control voltage having a voltage level that is adjusted based on the control signal, to maintain the output voltage to be stable; and
   a clock generator circuit configured to generate the multi-phase clock signals to control the switch network circuit to enter the charge stage and to enter the pump stage.

2. The circuit of claim 1, wherein the switch network circuit is configured to adjust a conductivity of a switch coupled to the flying capacitor based on the control signal during the pump stage of a charging cycle to adjust the pump control voltage.

3. The circuit of claim 2, wherein the switch comprises:
   a transistor configured to receive the control signal at a gate terminal, and a drain terminal of the transistor being coupled to the flying capacitor, and a voltage drop on the transistor being a function of the control signal.

4. The circuit of claim 1, wherein the amplifier includes an operational transconductance amplifier (OTA) coupled with a capacitor, the operational transconductance amplifier is configured to output a current based on a difference between the output voltage and a reference voltage to charge the capacitor by the current to generate the voltage on the capacitor.

5. The circuit of claim 1, wherein the logic comprises:
   a transmission gate that is controlled by the multi-phase clock signals to relay the buffered voltage to generate the control signal.

6. A method for regulating voltage, the method comprising:
   generating a control signal having a voltage level as a function of an output voltage on a load capacitor by (i) generating a voltage based on a comparison of the output voltage to a reference voltage, (ii) buffering the voltage to output a buffered voltage, and (iii) combining the buffered voltage with multi-phase clock signals to generate the control signal;
   providing the control signal to a switch network circuit that is coupled with the load capacitor and a flying capacitor to form a charge pump circuit;
   charging the flying capacitor in a charge stage;
   providing a pump control voltage to the flying capacitor in a pump stage, the pump control voltage having a voltage level that is adjusted based on the control signal to maintain the output voltage to be stable; and
   generating the multi-phase clock signals to control the switch network circuit to enter the charge stage and to enter the pump stage.

7. The method of claim 6, wherein providing the pump control voltage to the flying capacitor during in the pump stage further comprises:
   adjusting a conductivity of a switch coupled to the flying capacitor based on the control signal during the pump stage of a charging cycle to adjust the pump control voltage to the flying capacitor.

8. The method of claim 7, wherein adjusting the conductivity of the switch coupled to the flying capacitor based on the control signal during the pump stage of the charging cycle to adjust the pump control voltage to the flying capacitor comprises:
   providing the control signal to a gate terminal of a transistor with a drain terminal coupled to the flying capacitor, and a voltage drop on the transistor being controlled based on the control signal in order to adjust the pump control voltage to the flying capacitor.

9. The method of claim 6, wherein generating the voltage based on the comparison of the output voltage to the reference voltage further comprises:
outputting a current from an operational transconductance amplifier (OTA) based on a different between the output voltage and the reference voltage; and
charging a capacitor by the current to generate the voltage on the capacitor.

10. The method of claim 6, wherein combining the voltage with the multi-phase clock signals to generate the control signal comprises:
controlling a transmission gate by the multi-phase clocks signals to relay the buffered voltage to generate the control signal.

11. An integrated circuit (IC) chip, comprising:
a voltage regulator that comprises:
a control signal generator circuit configured to generate a control signal with a voltage level that is a function of an output voltage on a load capacitor, the control signal generator circuit including (i) an operational transconductance amplifier (OTA) coupled with a capacitor, the operational transconductance amplifier configured to output a current based on the output voltage and a reference voltage to charge the capacitor to generate the voltage on the capacitor, (ii) a voltage buffer configured to buffer the voltage and output a buffered voltage, and (iii) a logic circuit configured to combine the buffered voltage with multi-phase clock signals to generate the control signal; and
a switch network circuit coupled with the load capacitor and a flying capacitor to form a charge pump circuit, the switch network circuit being configured to charge the flying capacitor in a charge stage and to pump the flying capacitor in a pump stage to generate the output voltage on the load capacitor, the switch network circuit configured to provide a pump control voltage to the flying capacitor during the pump stage, the pump control voltage having a voltage level that is adjusted based on the control signal to maintain the output voltage to be stable;
one or more functional circuits that are powered up by the output voltage on the load capacitor; and
a clock generator circuit configured to generate the multi-phase clock signals to control the switch network circuit to enter the charge stage and to enter the pump stage.

12. The IC chip of claim 11, wherein the switch network circuit is configured to adjust a conductivity of a switch coupled to the flying capacitor based on the control signal during the pump stage of a charging cycle to adjust the pump control voltage.

13. The IC chip of claim 12, wherein the switch comprises:
a transistor configured to receive the control signal at a gate terminal, and a drain terminal of the transistor being coupled to the flying capacitor, and a voltage drop on the transistor being a function of the control signal.

14. The IC chip of claim 11, wherein:
a transmission gate that is controlled by the multi-phase clocks signals to relay the buffered voltage to generate the control signal.

* * * * *